(12) United States Patent
Hsu

(10) Patent No.: US 6,842,983 B1
(45) Date of Patent: Jan. 18, 2005

(54) LOCATING STRUCTURE OF EXPANDABLE OVAL HANDLES OF GARDEN SHEARS

(75) Inventor: Sheng-Ming Hsu, Chang-Hua Hsien (TW)

(73) Assignee: Ho Cheng Garden Tools Co., Ltd., Chang Hua Hsien (TW)

( * ) Notice: Subject to any disclaimer, the term of this patent is extended or adjusted under 35 U.S.C. 154(b) by 159 days.

(21) Appl. No.: 10/361,171

(22) Filed: Feb. 10, 2003

(51) Int. Cl.$^7$ .............................................. B26B 13/12
(52) U.S. Cl. ........................................ 30/231; 30/254
(58) Field of Search ...................... 30/231, 254, 249, 30/296.1; 15/144.1, 144.3, 144.4; 16/429

(56) References Cited

U.S. PATENT DOCUMENTS

| | | | | |
|---|---|---|---|---|
| 3,317,997 A | * | 5/1967 | Hedstrom et al. | ............ 30/248 |
| 4,922,577 A | * | 5/1990 | Unger | ......................... 16/429 |
| 5,228,202 A | * | 7/1993 | Liao | ............................. 30/249 |
| 5,933,965 A | * | 8/1999 | Linden et al. | ................ 30/249 |
| 6,272,755 B1 | * | 8/2001 | Mittlesteadt et al. | ......... 30/249 |

* cited by examiner

*Primary Examiner*—Hwei-Siu Payer
(74) *Attorney, Agent, or Firm*—Alan D. Kamrath; Nikolai & Mersereau, P.A.

(57) ABSTRACT

A pair of gardening shears includes two expandable handles, each handle being formed of an oval outer tube, an oval inner tube, and a grip rotatably fastened to the lower end of the outer tube. The inner tube is slidably fitted at the lower end into the upper end of the outer tube in conjunction with a locating structure including a threaded rod fastened at the lower end to the grip, an upper arresting block, a lower arresting block, and a spring located between the two arresting blocks, which are actuated by the threaded rod to arrest the inner tube at the time when the grip is turned counterclockwise. The inner tube is relieved of the pressures exerting thereon by the two arresting blocks at the time when the grip is tuned clockwise.

1 Claim, 4 Drawing Sheets

LOCATING STRUCTURE OF EXPANDABLE OVAL HANDLES OF GARDEN SHEARS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a pair of gardening shears comprising two expandable oval handles, and more particularly to a locating structure of the expandable oval handles of the gardening shears.

BACKGROUND OF THE INVENTION

The conventional gardening shears comprise two expandable oval handles which can be adjusted in length in conjunction with a locating structure. The locating structure is mounted on the exterior of the expandable oval handles and is not only complicated in construction but also inefficient at best. In another words, the working efficiency of the conventional gardening shears is bound to be undermined by such a defective design of the locating structure.

BRIEF SUMMARY OF THE INVENTION

The primary objective of the present invention is to provide a pair of gardening shears comprising two expandable oval handles, each having internally a locating structure by which the handle is easily adjusted in length.

In keeping with the principle of the present invention, the foregoing objective of the present invention is attained by a pair of gardening shears comprising two handles, each being formed of an oval inner tube, an oval outer tube, a grip, and a locating structure. The oval inner tube is fastened at the upper end with a blade and is slidably fitted at the lower end thereof into the upper end of the oval outer tube. The outer tube is fastened at the lower end with the grip. The locating structure comprises a threaded rod, an upper arresting block, and a lower arresting block. The threaded rod is fastened at the lower end with the grip such that the threaded rod is actuated to turn at the time when the grip is turned. The upper arresting block is provided with a first bevel and is fastened with the upper end of the threaded rod. The lower arresting block is provided with a second bevel and is fastened with the threaded rod such that the lower arresting block is actuated by the threaded rod in motion to move toward or away from the upper arresting block. As the grip is turned counterclockwise, the threaded rod is actuated to turn to force the lower arresting block to move toward the upper arresting block, thereby causing the second bevel of the lower arresting block to press against the first bevel of the upper arresting block. As a result, the upper arresting block and the lower arresting block are forced to press against the opposite sides of the inner wall of the inner tube. The inner tube is thus arrested jointly by the upper arresting block and the lower arresting block. The inner tube can be extended by turning the grip in the clockwise direction to cause the lower arresting block to move away from the upper arresting block. As a result, the inner wall of the inner tube is relieved of the pressures of the upper arresting block and the lower arresting block. The inner tube can be thus moved up and down inside the outer tube.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
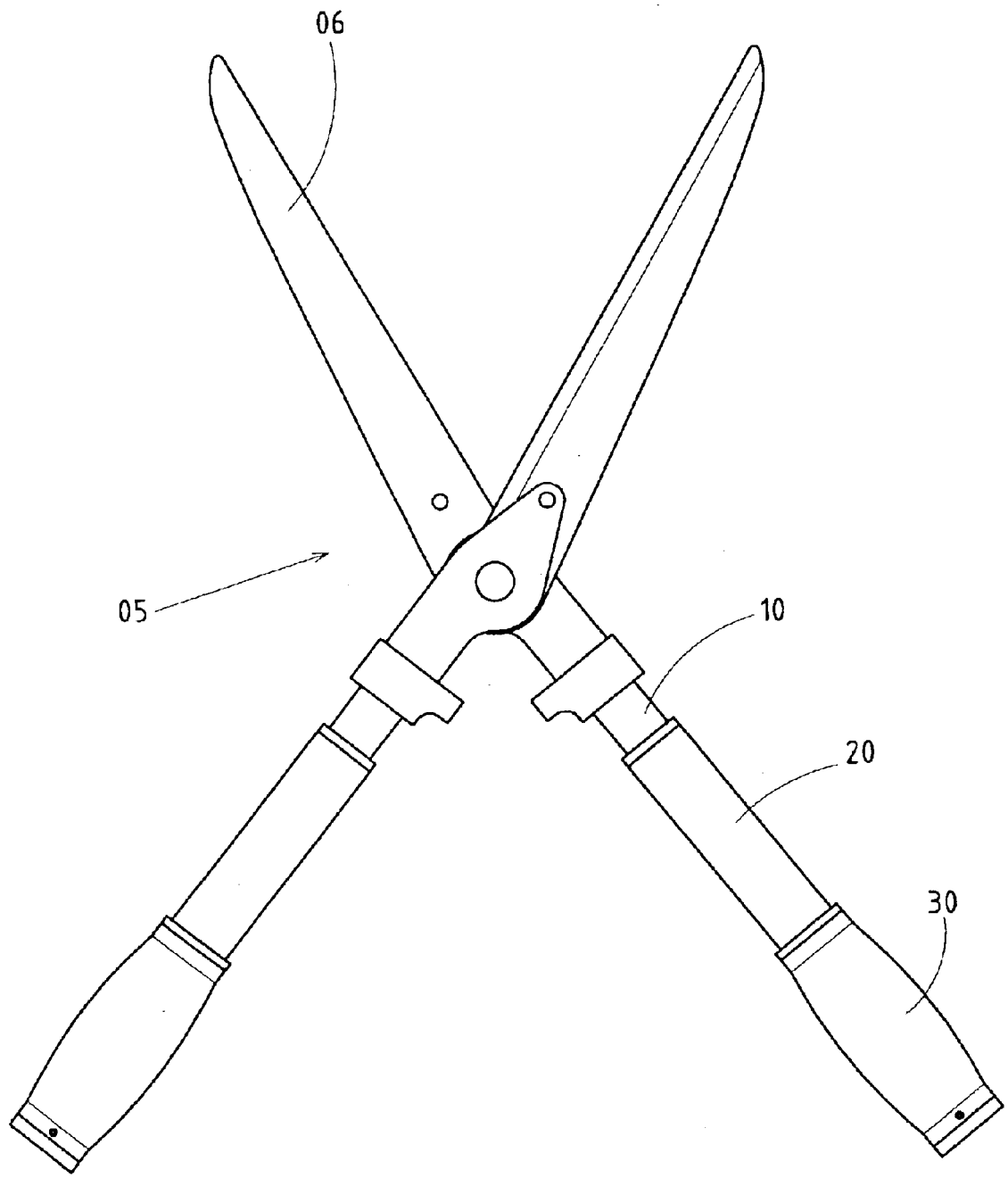
FIG. 1 shows a perspective view of the preferred embodiment of the present invention.

As shown in FIG. 1, a pair of gardening shears 05 embodied in the present invention comprises two handles, each being formed of an inner tube 10, an outer tube 20, and a grip 30. The inner tube 10 and the outer tube 20 have an oval cross section. The inner tube 10 is fastened at an upper end with a blade 06 and is slidably fitted at a lower end into an upper end of the outer tube 20. The outer tube 20 is fastened at a lower end with the grip 30. The handles can be adjusted in length by locating the inner tube 10 inside the outer tube 20. The present invention is characterized by the handles, each of which is provided with a locating structure for locating the inner tube 10 inside the outer tube 20.

Figure 2:
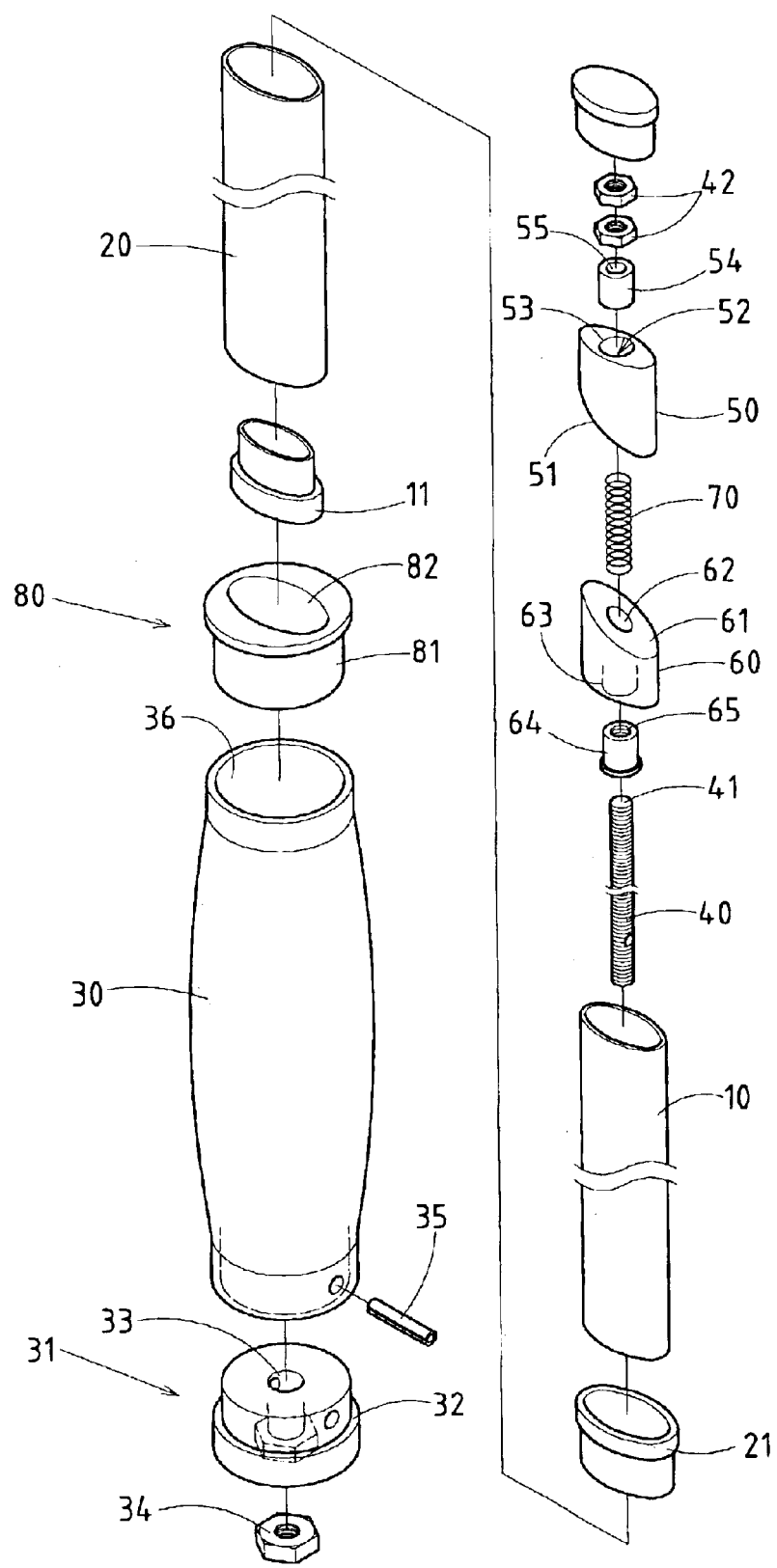
FIG. 2 shows an exploded perspective view of the locating structure of the preferred embodiment of the present invention.
Figure 3:
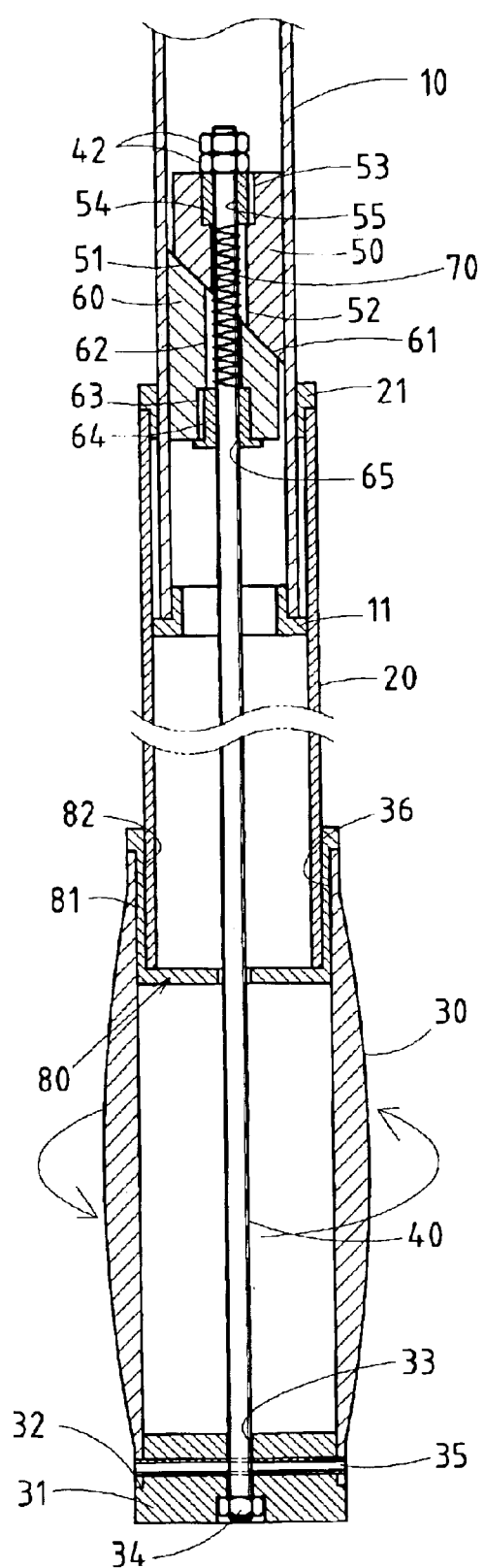
FIG. 3 shows a longitudinal sectional view of the locating structure of the preferred embodiment of the present invention at work to locate the inner tube securely inside the outer tube.
Figure 4:
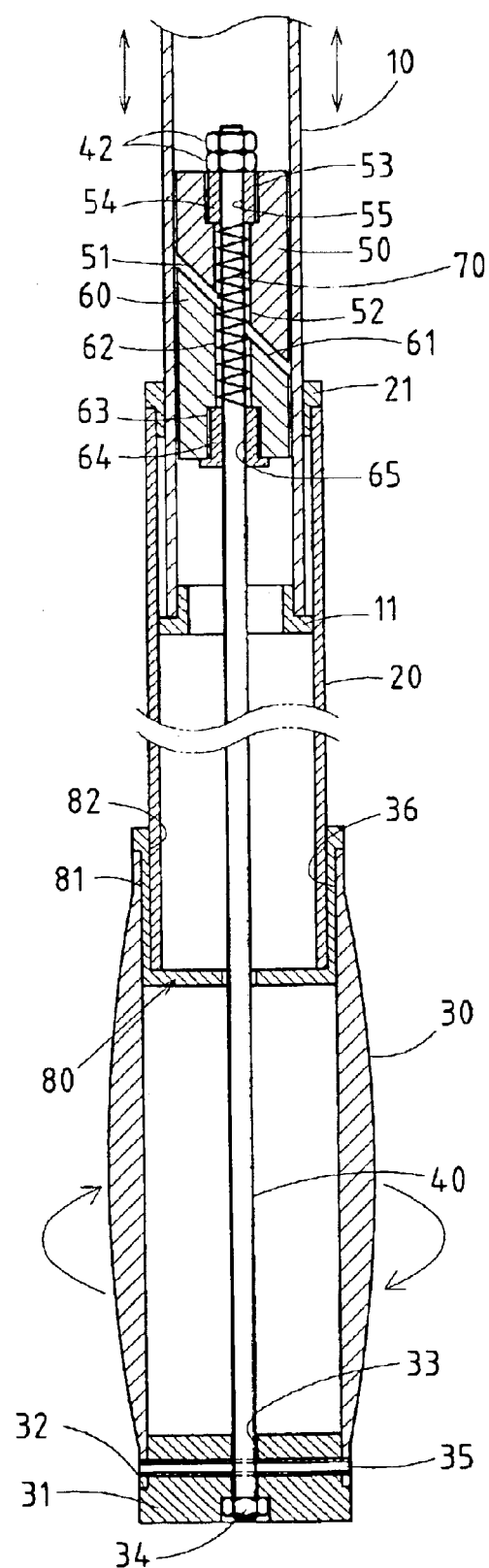
FIG. 4 shows a longitudinal sectional view of the locating structure of the preferred embodiment of the present invention at work to enable the inner tube to be moved up and down in the interior of the outer tube.

As shown in FIGS. 2, 3, and 4, the inner tube 10 is provided at the lower end with a first stop ring 11 while the outer tube 20 is provided at the upper end with a second stop ring 21, which cooperates with the first stop ring 11 to prevent the inner tube 10 from slipping completely out of the upper end of the outer tube 20. The outer tube 20 is fastened at the lower end with an upper end of the grip 30 in conjunction with a fastening seat 80 which is provided with an oval retaining slot 82 to retain the lower end of the outer tube 20. The fastening seat 80 is further provided with a round protrusion 81, which is securely retained in around retaining slot 36 of the upper end of the grip 30. The grip 30 is provided at a lower end with an end piece 31 which is provided with a flange 32 and a center through hole 33. The end piece 31 is fastened with the grip 30 by a fastening bolt 35.

The locating structure of the present invention comprises a threaded rod 40, an upper arresting block 50, a lower arresting block 60, and a spring 70.

The threaded rod 40 is fastened at the lower end with the end piece 31 of the grip 30 in conjunction with a nut 34 which is engaged with the lower end of the threaded rod 40 via the center through hole 33 of the end piece 31.

The upper arresting block 50 is provided at the lower end with a first bevel 51 and is further provided with a center through hole 52. The center through hole 52 is provided at the upper end with a receiving slot 53 greater in diameter than the center through hole 52. The upper arresting block 50 is provided with a pivoting block 54, which is located in the receiving slot 53 of the upper arresting block 50 and is provided with a center through hole 55. The upper arresting block 50 is fastened with an upper end 41 of the threaded rod 40 by two nuts 42 which are engaged with the upper end 41 via the center through holes 52 and 55.

The lower arresting block 60 is provided at the upper end with a second bevel 62 and is further provided with a center through hole 62 which is in turn provided at the lower end with a receiving slot 63 greater in diameter than the center through hole 62. The receiving slot 63 is used to accommodate a movable block 64 which is provided with a threaded through hole 65. The lower arresting block 60 is fastened with the threaded rod 40, which is put through the center through hole 62 and is engaged with the threaded through hole 65 of the movable block 64. As the threaded rod 40 is actuated to turn by the grip 30 in motion, the movable block 64 is actuated to move upward or downward.

The spring 70 is fitted over the threaded rod 40 in such a way that the spring 70 is received in the center through hole 52 of the upper arresting block 50 and the center through hole 62 of the lower arresting block 60, and that the upper end of the spring 70 urges the pivoting block 54 of the upper arresting block 50, and that the lower end of the spring 70 urges the movable block 64 of the lower arresting block 60.

As illustrated in FIG. 3, the grip 30 is turned counterclockwise to actuate the threaded rod 40 to turn, thereby resulting in upward movement of the movable block 64. The lower arresting block 60 is thus pushed by the movable block 64 in motion to move toward the upper arresting block 50. As the second bevel 61 of the lower arresting block 60 presses against the first bevel 51 of the upper arresting block 50, the two arresting blocks 50 and 60 are caused to displace to press against opposite sides of the inner wall of the inner tube 10, so as to arrest the inner tube 10. The inner tube 10 is thus located securely inside the outer tube 20.

The handles can be adjusted in length by turning the grip 30 in clockwise direction, as illustrated in FIG. 4. As a result, the threaded rod 40 is actuated to turn to result in the downward movement of the movable block 64. As the lower arresting block 60 is relieved of the pressure exerting thereon by the movable block 64, the second bevel 61 of the lower arresting block 60 is separated from the first bevel 51 of the upper arresting block 50. As a result, the opposite sides of the inner wall of the inner tube 10 are relieved of the pressures exerting thereon by the two arresting blocks 50 and 60. The inner tube 10 can be thus moved up and down freely in the interior of the outer tube 20.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:
1. A pair of gardening shears comprising two expandable handles, each handle being comprised of an oval outer tube, an oval inner tube slidably fitted at a lower end into an upper end of said outer tube in conjunction with a locating structure, and a grip fastened rotatably to a lower end of said outer tube such that said grip actuates said locating structure to locate said inner tube inside said outer tube;
  wherein said locating structure comprises:
    a threaded rod fastened at a lower end to said grip that said threaded rod is actuated to turn by said grip in motion;
    an upper arresting block comprised of, in a lower end, a first bevel and a center through hole, said center through hole being provided at an upper end with a receiving slot greater in diameter than said center through hole, said receiving slot being used to accommodate a pivoting block whereby said upper arresting block is fastened to an upper end of said threaded rod such that said pivoting block is fastened to said threaded rod via said center through hole of said upper arresting block, and such that said upper arresting block is located in the lower end of said inner tube;
    a spring fitted over the upper end of said threaded rod such that an upper end of said spring urges said pivoting block of said upper arresting block; and
    a lower arresting block comprised of, in an upper end, a second bevel and a center through hole which is provided at a lower end with a receiving slot greater in diameter than said center through hole, said receiving slot being used to accommodate a movable block which is comprised of a threaded through hole in alignment with said center through hole whereby said lower arresting block is fastened to said threaded rod such that said lower arresting block is located in the lower end of said inner tube and below said upper arresting block, and such that said movable block is urged by a lower end of said spring, and such that said threaded through hole of said movable block is engaged with said threaded rod, thereby enabling said movable block to move to push said lower arresting block to cause said second bevel of said lower arresting block to press against said first bevel of said upper arresting block so as to cause said lower arresting block and said upper arresting block to displace to press against opposite sides of the inner wall of said inner tube at the time when said grip is turned counterclockwise, said lower arresting block being relieved of the pressure exerting thereon by said movable block so as to cause said second bevel of said lower arresting block to separate from said first bevel of said upper arresting block at the time when said grip is turned clockwise, thereby relieving the inner wall of said inner tube of the pressures exerting thereon by said upper arresting block and said lower arresting block.

\* \* \* \* \*